(12) United States Patent
Schwärzler et al.

(10) Patent No.: US 6,299,544 B1
(45) Date of Patent: Oct. 9, 2001

(54) DOUBLE OFFSET JOINT WITH CENTERING MEANS FOR CAGE

(75) Inventors: Peter Schwärzler, Glattbach; Friedhelm John, Obertshausen, both of (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 09/455,897

(22) Filed: Dec. 6, 1999

(30) Foreign Application Priority Data

Dec. 8, 1998 (DE) .............................................. 198 56 424

(51) Int. Cl.[7] ...................................................... F16D 3/16
(52) U.S. Cl. ........................ 464/146; 464/906; 464/145; 464/143
(58) Field of Search .................... 464/146, 145, 464/143, 906

(56) References Cited

U.S. PATENT DOCUMENTS

| 3,785,172 | | 1/1974 | Parsons . | |
|---|---|---|---|---|
| 4,020,648 | | 5/1977 | Krude . | |
| 5,106,343 | * | 4/1992 | Sakaguchi et al. | 464/146 |
| 5,222,914 | * | 6/1993 | Mazziotti | 464/144 |
| 5,692,961 | * | 12/1997 | Turner | 464/146 |

FOREIGN PATENT DOCUMENTS

| 38 19 582 C1 | 6/1988 | (DE) . |
|---|---|---|
| 43 27 990 C1 | 8/1993 | (DE) . |
| 03061720 | 3/1991 | (JP) . |
| 3-255226 | 11/1991 | (JP) . |
| 3-282012 | 12/1991 | (JP) . |
| 9-14281 | 1/1997 | (JP) . |
| 9-280261 | 1/1997 | (JP) . |
| 9-42304 | 2/1997 | (JP) . |
| WO 94/27056 | 11/1994 | (WO) . |

* cited by examiner

Primary Examiner—Lynne H. Browne
Assistant Examiner—Aaron Dunwoody

(57) ABSTRACT

A constant velocity ball joint having an outer joint part with an inner cylindrical guiding face provided with first, longitudinally extending ball grooves; an inner joint part with a convex guiding face provided with second, longitudinally extended ball grooves; and torque transmitting balls which run in the first and second ball grooves. The balls are held by an annular ball cage in a ball center plane (E). The ball cage comprises an outer spherical control face whose greatest diameter is axially removed in a first direction by a distance (x) from the ball center plane (E) and wherein the ball cage comprises an inner concave control face whose greatest diameter is axially removed in a second direction by a distance (x) from the ball center plane (E). The inner control face in the ball cage forms end stops for delimiting an axial displacement path of the inner joint part relative to the ball cage. The joint further includes resilient members which are effective between the ball cage and the inner joint part and which, when the ball cage is axially displaced relative to the inner joint part from the center of the axial displacement path, are pre-tensioned.

14 Claims, 4 Drawing Sheets

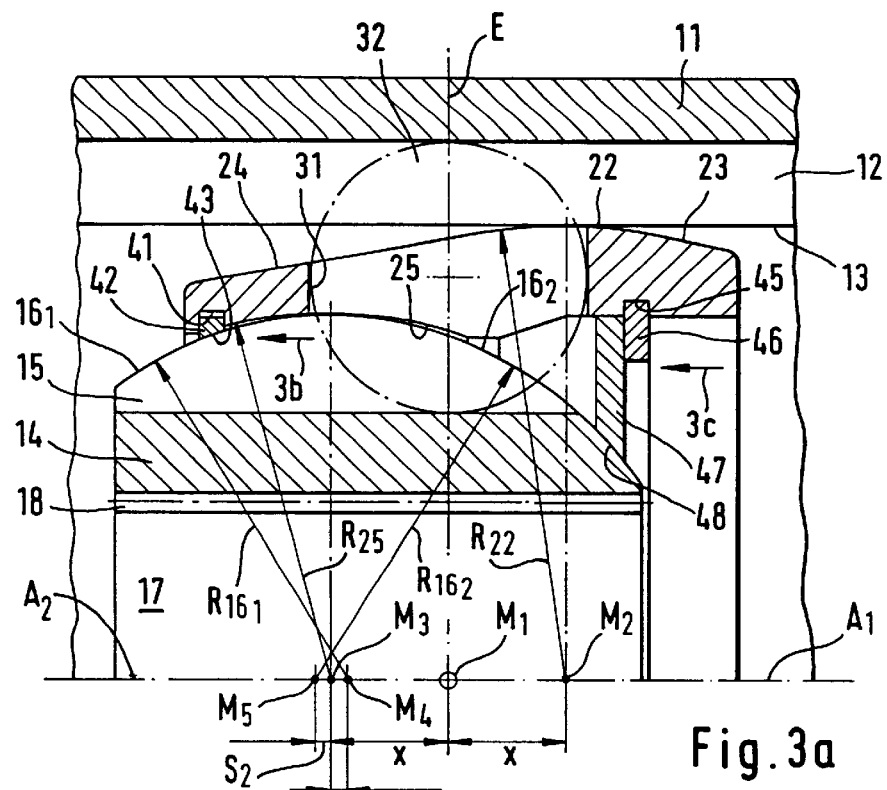
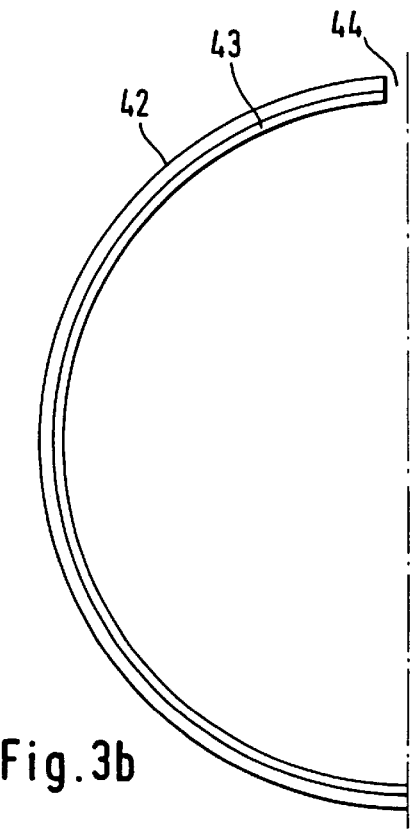
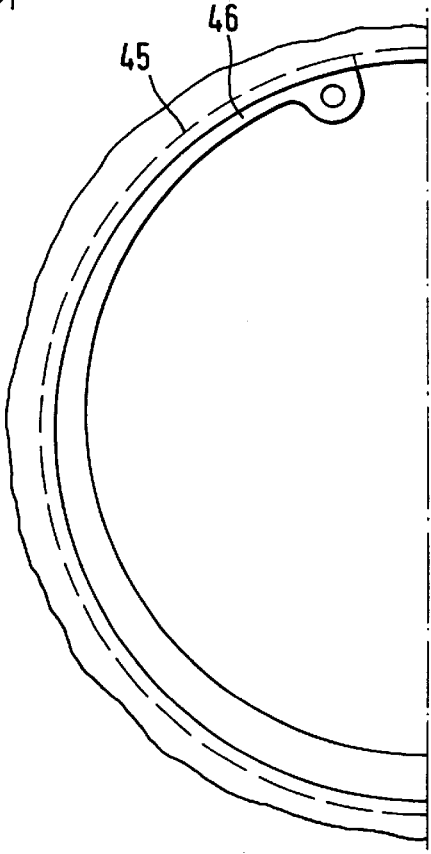

DOUBLE OFFSET JOINT WITH CENTERING MEANS FOR CAGE

BACKGROUND OF THE INVENTION

The invention relates to a constant velocity ball joint and, more particularly, to a double-offset joint with centering means for a cage. Constant velocity ball joints include an outer joint part with an inner cylindrical guiding face provided with first, longitudinally extending ball grooves; an inner joint part with a convex guiding face provided with second, longitudinally extending ball grooves; and torque transmitting balls which run in the first and second ball grooves. The balls are held by an annular ball cage in a ball center plane E. The ball cage comprises an outer spherical control face whose greatest diameter is axially removed in a first direction by a distance x from the ball center plane E. The ball cage also comprises an inner concave control face whose greatest diameter is axially removed in a second direction by a distance x from the ball center plane E. The inner control face in the ball cage forms end stops for delimiting an axial displacement path of the inner joint part relative to the ball cage. With reference to the positions of the central planes of the control faces at the ball cage relative to the ball center plane, such joints are called double offset joints (DO joints). They are described in DE 24 61 226 C2, for example.

If the outer joint part is articulated relative to the inner joint part, the control faces at the ball cage control the balls received in circumferentially distributed cage windows in the ball cage in such a way that they move on to the plane bisecting the angle between the axes of the outer joint part and of the inner joint part. In consequence, while ignoring the different contact radii, the balls carry out a predominantly rolling movement in the outer ball grooves and in the inner ball grooves.

Because the cage, by way of the outer control face, engages the inner cylindrical guiding face of the outer joint part with a corresponding diameter, the joint is also able to carry out axial displacement movements between the outer joint part and the inner joint part. Under ideal conditions, it is assumed that by rolling movements, the balls would set themselves in the outer ball grooves and the inner ball grooves to half the axial displacement between the inner joint part and the outer joint part. In fact, however, the balls are prevented from doing so because of the substantially fitting, positive engagement between the ball cage and the inner joint part. Furthermore, because of the common axial movement of the ball cage and the inner joint part, there occurs a sliding movement between the balls and the inner ball grooves. As a result, there are generated high axial displacement forces in the joint. Moreover, any vibrations introduced into the joint are transmitted almost in their entirety.

By specifically designing the convex guiding face of the inner joint part as compared to the inner concave control face of the ball cage, it has already been proposed to permit a short axial displacement path between the ball cage and the inner joint part. This is intended to permit the required rolling movements of the balls in the inner ball grooves in a small axial region and thus to reduce friction and to tackle the problem of the transmission of vibrations in the range of slight axial vibration symptoms. But in such a case, the ball cage—because of its indifferent position and the influence of torque when the joint is articulated—moves into one of the positions of abutment relative to the inner joint part. The result is that the required effect of free rolling movements in both directions is lost. In addition, if the joint is used in the motor vehicles for example, vibrations are transmitted "rigidly" from the engine-gearbox unit via the joint to the vehicle body.

SUMMARY OF THE INVENTION

It is therefore an object of the invention to provide a constant velocity joint that reliably cuts off the vibrations resulting from slight axial vibration symptoms.

According to the invention, there is provided a joint having a resilient means which is effective between the ball cage and the inner joint part and which, at least when the ball cage is axially displaced relative to the inner joint part from the center of the axial displacement path in one axial direction, is pre-tensioned.

According to a first embodiment, the joint includes one or more resilient members which are effective between the ball cage and the inner joint part and which, when the ball cage is axially displaced relative to the inner joint part from the center of the axial displacement path, are pre-tensioned. The resilient members ensure that the ball cage, especially when the joint is in the aligned position, is set, even under torque. Preferably, it is set to the center of the possible relative displacement path relative to the inner joint part, so that in the case of external axial excitations, the desired vibration cut-off is ensured by the joint. The characteristics of the joint when articulated are also improved because in that case, the different rolling paths in the outer ball grooves and inner ball grooves do not initially lead to sliding movements of the balls relative to the inner ball grooves. Further, from the central position of the ball cage relative to the inner joint part, relative axial displacements are possible. The tendency of the ball sliding in the inner ball groove is therefore avoided for a certain articulation angle.

A second embodiment comprises a constant velocity ball joint which is characterized by resilient members which are effective between the ball cage and the inner joint part and which, at least when the ball cage is axially displaced relative to the inner joint part from the central position of the axial displacement path in one axial direction, are pre-tensioned. According to this design, especially when the joint is articulated under torque, the cage is loaded in a first direction by forces applied by the ball grooves to the balls while being loaded by the resilient members in the opposed axial direction. Thus, in operation, the cage is set to the center of the possible relative displacement path relative to the inner joint part, thus achieving the desired vibration cut-off when external axial excitations are introduced into the joint.

According to a preferred embodiment, the resilient members consist of resilient annular rings which are inserted inside the ball cage and which are in contact with the convex guiding face of the inner joint part on both sides of the greatest diameter. For fixing the resilient members, there are provided simple recesses or grooves, otherwise, the design of the components remains unchanged. To increase the size of the contact face, the inner joint part can be axially increased in length in the direction of the outer control face of the ball cage.

In one embodiment, the resilient annular rings, on their inside or their outside, can be provided with radial fingers, by means of which, like plate springs, they are axially deflectable at their inner annular edges which cooperate with the inner joint part.

According to a further embodiment, the resilient annular rings can be radially resiliently inserted into the grooves or recesses in the ball cage, while being especially circumferentially slotted. When axially loaded by the inner joint part, such annular rings can be widened by being radially expanded, as a result of which they penetrate the grooves or recesses in the ball cage more deeply.

According to yet a further embodiment, the resilient annular rings can be provided in the form of a resilient crinkled spring washer which is supported by a securing ring and which, in itself, is axially compressible.

A preferred embodiment of the convex face of the inner joint part comprises two spherical face portions whose centers are displaced relative to the plane of the greatest diameter by equal amounts in opposite directions in such a way that the radii of curvature of the spherical face portions intersect one another. In a longitudinal section, this results in a so-called Gothic shape which, as compared to a purely inner spherical shape of the control face of the ball cage, permits the axial displacement path. If identical diameters of curvature are used for the spherical face portions and the control face, the offset centers of the former results in a slight difference in diameters, which difference permits an axial displacement path. In addition, the annular edge between the two spherical face portions can be slightly rounded.

A further embodiment of the convex guiding face of the inner joint part comprises a purely spherical shape, with the inner control face of the ball cage being composed of a plurality of face portions in such a way as to permit the axial displacement path between the ball cage and the inner joint part. In this embodiment, the control face comprises an inner cylindrical central portion and two tangentially adjoining spherical face portions whose centers of curvature are thus removed from one another by the length of the central portion. The length determines the axial displacement path. The diameters of curvature of the guiding face and of the spherical face portions can be substantially identical. Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be had to the embodiments illustrated in greater detail in the accompanying drawings and described below by way of examples of the invention. In the drawings:

FIG. 3 is a first schematic embodiment of a DO joint according to the present invention:

a) in half a longitudinal section;

b) in a plan view in the direction of arrow 3b of FIG. 3a;

c) in a plan view in the direction of arrow 3c of FIG. 3a.

Figure 4A:
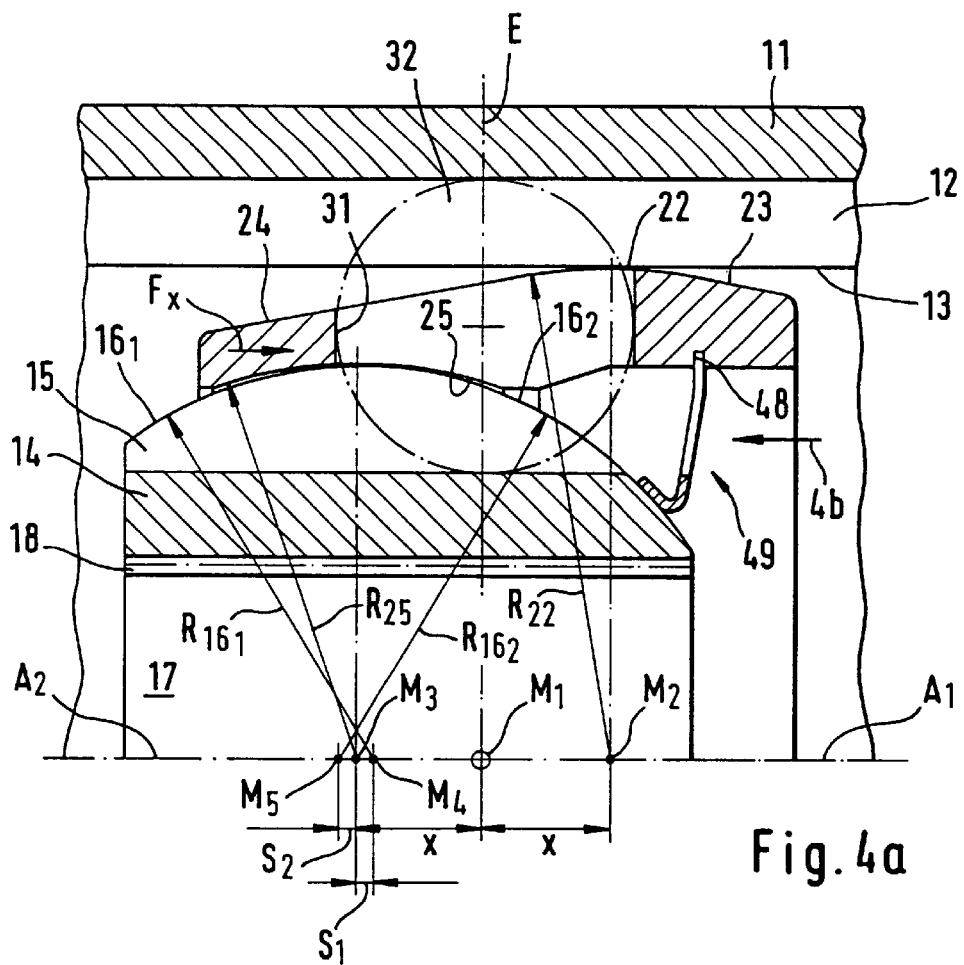

FIG. 4 shows a second embodiment of a DO joint according to the present invention:

a) in half a longitudinal section;

b) in a plan view in the direction of arrow 4b of FIG. 4a.

Figure 5A:
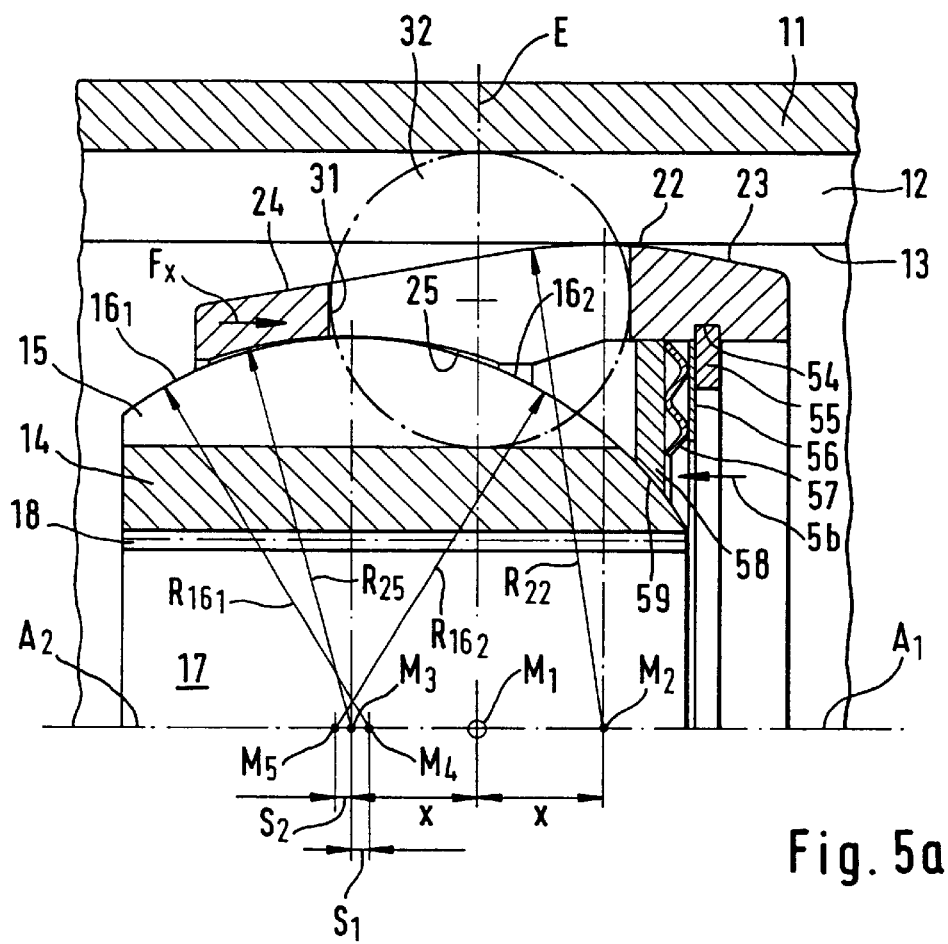

FIG. 5 shows a third embodiment of a DO joint according to the present invention:

a) in half a longitudinal section;

b) in a plan view in the direction of arrow 5b of FIG. 5a.

DETAILED DESCRIPTION OF A PREFERRED EMBODIMENT

Figure 1:
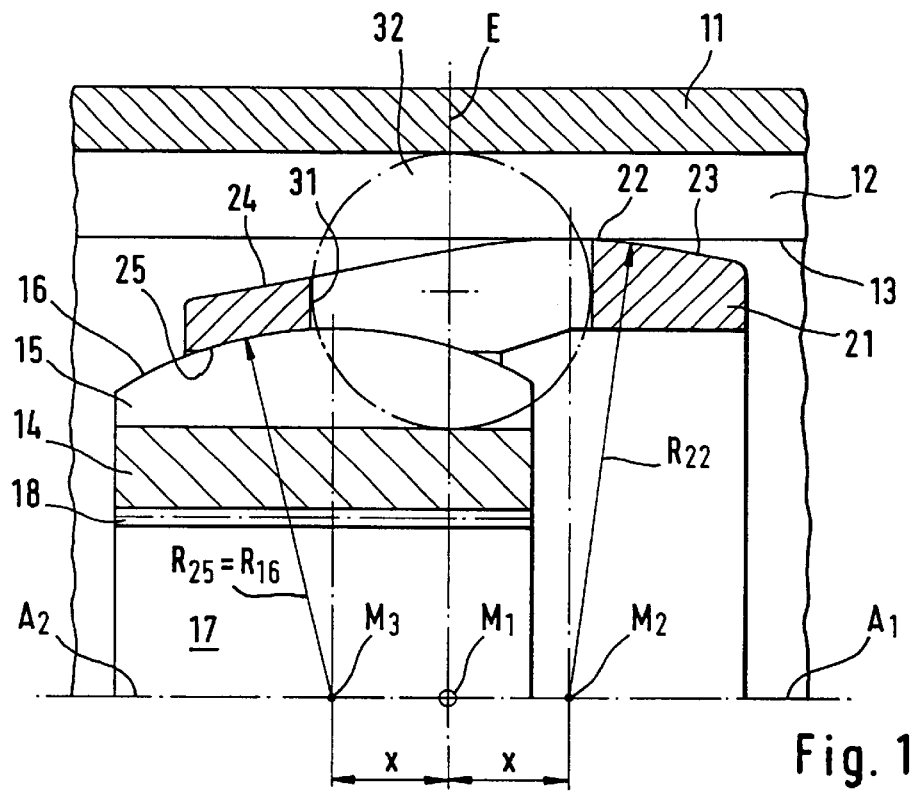
FIG. 1 is half a longitudinal section through a first embodiment of a conventional DO joint.
Figure 2:
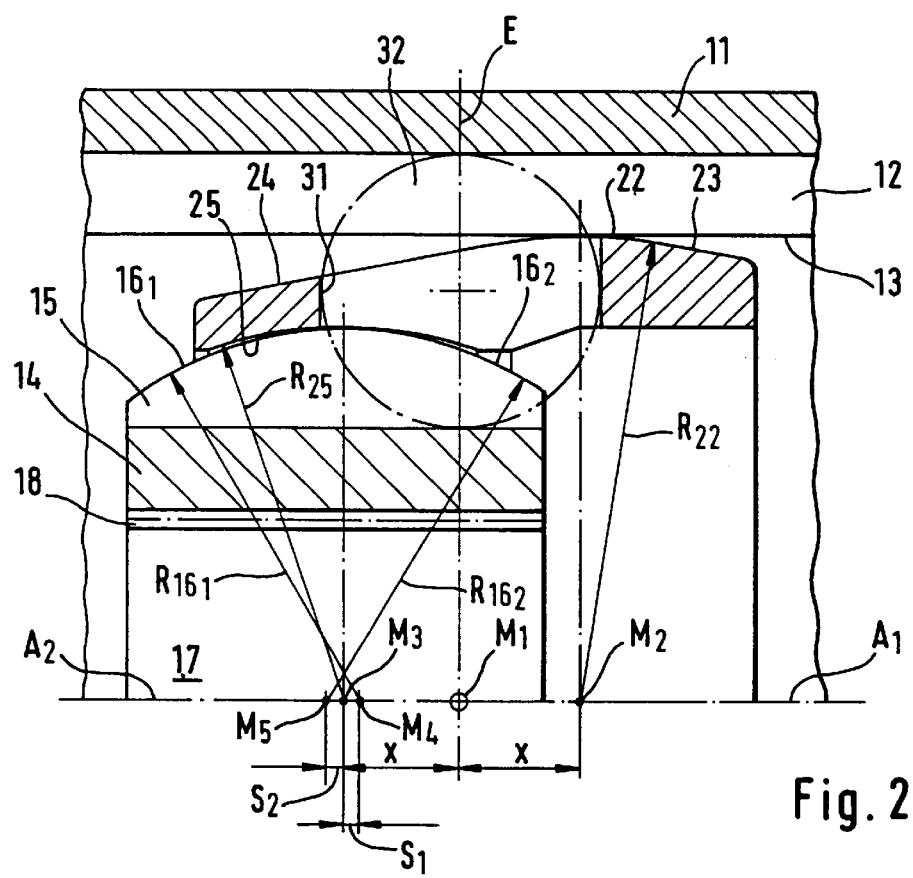
FIG. 2 is half a longitudinal section through a second embodiment of a conventional DO joint.

FIGS. 1 and 2 each show a broken-off longitudinal section through an outer joint part 11 according to the prior art. On the inside of the outer joint part 11 there is formed one of a plurality of first longitudinally extending ball grooves 12. The ball grooves are positioned in an inner cylindrical guiding face 13. The outer joint part 11 is symmetric relative to its longitudinal axis $A_1$. In the outer joint part 11 there is positioned an inner joint part 14 on whose circumference there are distributed longitudinally extending second ball grooves 15. The second ball grooves 15 are formed into a convex guiding face 16. The inner joint part 14 is provided with an inner aperture with shaft toothing 18 into which there has to be inserted a driveshaft. The inner joint part 14 is symmetric relative to its longitudinal axis $A_2$.

A ball cage 21 is guided by the inner cylindrical guiding face 13 on the one hand and by the convex guiding face 16 on the other hand. The ball cage 21 comprises an external spherical control face 22 which is in direct contact with the inner cylindrical guiding face 13. The control face 22 is a spherical face portion or a similar barrel face which is substantially tangentially adjoined by two conical faces 23, 24. On its inner face, the ball cage 21 forms a concave control face 25 which slides on the guiding face 16 of the inner joint part 14. In the ball cage 21, there are provided circumferentially distributed ball windows 31 in which there are accommodated torque transmitting balls 32. The balls 32 each engage first ball grooves 12 in the outer joint part 11 and second ball grooves 15 in the inner joint part 14, which ball grooves 12, 15 are associated with one another. The balls are permanently held by the cage 21 in a common ball center plane E. The point of intersection between the longitudinal axes $A_1$, $A_2$, which coincide with one other when the joint is in an aligned position, and the ball center plane E forms the joint center and the joint articulation center $M_1$, respectively.

In FIG. 1, at an axial distance x from the center $M_1$, there is shown a center $M_2$ which, by a radius $R_{22}$, forms the spherical control face 22 of the ball cage 21. A center $M_3$ removed from the center $M_1$ by the same amount x in the opposite direction, is marked, which by a radius $R_{25}$, forms the inner concave control face 25 of the ball cage 21. The radius $R_{25}$ at the same time constitutes the generation radius $R_{16}$ of the external guiding face 16 of the inner joint part, which guiding face 16 is spherical in this case. In the embodiment shown here, the ball cage 21 is substantially axially play-free relative to the inner joint part 14.

The double offset of the centers $M_2$ and $M_3$ relative to the center $M_1$ along the joint axes $A_1$, $A_2$ is responsible for the term "double offset joint" for joints of this type. With an axial displacement of the inner joint part relative to the outer joint part and a rolling movement at the ball 32 in the first ball groove 12 and as a result of the ball cage 21 and the inner joint part 14 being axially coupled, the ball is forced to carry out a sliding movement relative to the second ball grooves 15.

FIG. 2 shows a first center $M_2$ positioned at an axial distance x from the center $M_1$ around which the control face 22 is generated at the ball cage 21 by means of the radius $R_{22}$. In the opposed axial direction, starting from the center $M_1$, there is provided a center $M_3$ which, by means of the radius $R_{25}$, forms the inner spherical control face 25 of the ball cage. At the respective distances $S_1$ and $S_2$ which are identical and extend in opposed directions relative to the center $M_3$, there are further centers $M_4$, $M_5$ which constitute the centers of partial faces $16_1$, $16_2$ which, by means of the radii $R16_1$, $R16_2$, are generated around said centers. The size of the radii $R_{16}$ substantially corresponds to the size of the radius $R_{25}$, and the line of intersection of the two spherical face portions $16_1$, $16_2$ would, in principle, form an edge unless it is slightly broken. If the radii $R_{16}$ are substantially identical to the radius $R_{25}$, a slight relative axial movement is possible between the ball cage 21 and the inner joint part 14. If the inner joint part 14 moves relative to the ball cage 21 by said amount around a central position, simultaneous rolling movements of the balls 32 in the ball grooves 32 and 15 are possible, with sliding movements of the balls 32 occurring only relative to the cage windows 31. In an axial regions, which corresponds to double the sum of $S_1$ and $S_2$, an axial displacement of the inner joint part relative to the outer joint part under clearly lower forces than those applied in the embodiment according to FIG. 1 is theoretically possible. In practice, however, the ball cage 31 has a tendency to rest against one of the guiding face portions $16_1$, $16_2$ by means of the control face 25, so that a minimum axial displacement in one of the two possible directions immediately generates increased friction forces which are the result of the sliding movement carried out by the balls 32 relative to the second ball grooves 15.

In a deviating embodiment (not shown here) whose effect and function are identical to those of the embodiment according to FIG. 2, the guiding face 16 can be generated to be purely spherical with the radius $R_{16}$ around the center $M_3$. In addition, the control faces are composed of two spherical face portions which extend around the centers $M_4$ and $M_5$, but whose radii do not intersect one another, with the spherical face portions being connected to one another by an inner central cylindrical face.

FIG. 3 shows a joint whose geometry substantially corresponds to that of the joint according to FIG. 2, with identical details having been given the same reference numbers. To that extent, reference is made to the description of FIG. 2. However, the inner joint part 14 is axially extended in length toward the outer control face 22 of the ball cage 21. As a result, the guiding face $16_2$ is extended toward the right. In the region of the guiding face portion $16_1$, an inner groove 41 is formed into the control face 25, into which inner groove 41 there is inserted with radial play a slotted securing ring 42 which, by means of a conical inner face 43, is resting on the control face $16_1$. Said ring is shown in FIG. 3b in the view indicated by arrow 3b. The circumferential slot 44 is also shown.

Into a further groove 45 in the region of the second guiding face $16_2$, there is inserted a circlip 46. In FIG. 3c, said circlip 46 is shown in its groove 45 in a view indicated by arrow 3c. A resilient disc 47, having a conical contact face 68, which is substantially deformable so as to become conical is supported on the circlip 46. In the position as illustrated, the inner joint part 14 is shown in the center of the possible displacement path of the inner joint part 14 relative to the ball cage 21. In the case of displacement in either of the two possible axial directions, either the securing ring 42 is deformed radially or the disc 47 is deformed axially so as to become conical and builds up returning forces which return the axial displacement, thus achieving a central position of the ball cage 21 relative to the inner joint part 14. In said central position, the distances between the control face 25 and the two guiding face portions $16_1$, $16_2$ in the axial direction are identical.

Figure 4B:
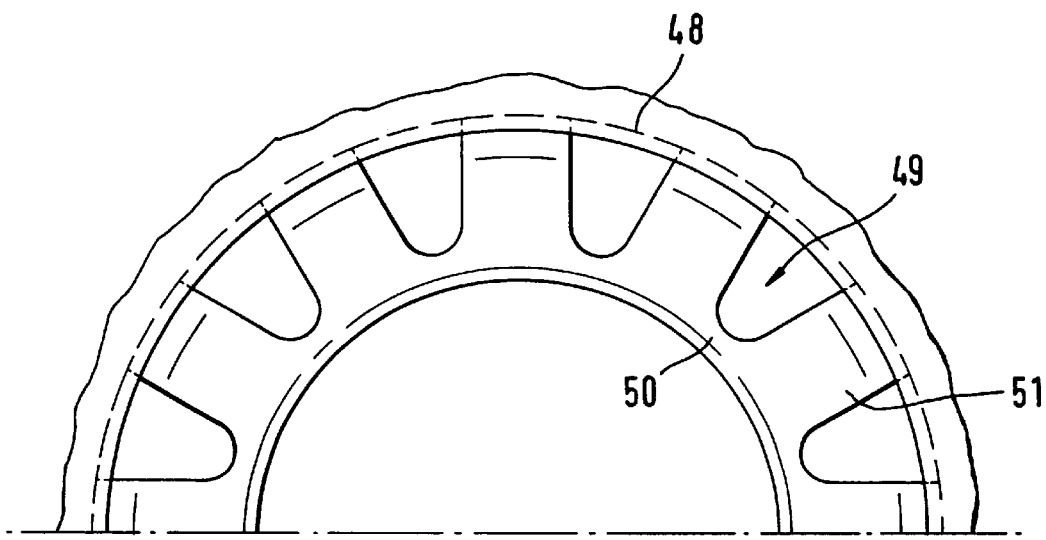

FIG. 4 shows a joint whose geometry, like the joint according to FIG. 3, substantially corresponds to that shown in FIG. 2. In this case, too, the guiding face $16_2$ has been extended toward the right. In the region of said guiding face $16_2$, the inside of the ball cage 21 is provided with an inner groove 48 into which there is inserted a resilient annular member 49. As in FIG. 4b which shows the plan view in the direction of arrow 4b, the resilient annular member comprises an inner ring 50 and an outer radial fingers 51 which directly engage the inner groove 48. If the inner joint part 14 is displaced relative to the ball cage 21 toward the right, the annular member 49 applies returning forces acting in the opposite direction. If the inner joint part 14 is displaced relative to the ball cage 21 in the opposite direction toward the left in the Figure, the inner joint part 14, under practical operating conditions, is returned into the illustrated central position by returning forces which are applied by the balls if the joint is articulated and which are symbolized by a force arrow $F_x$.

Figure 5B:
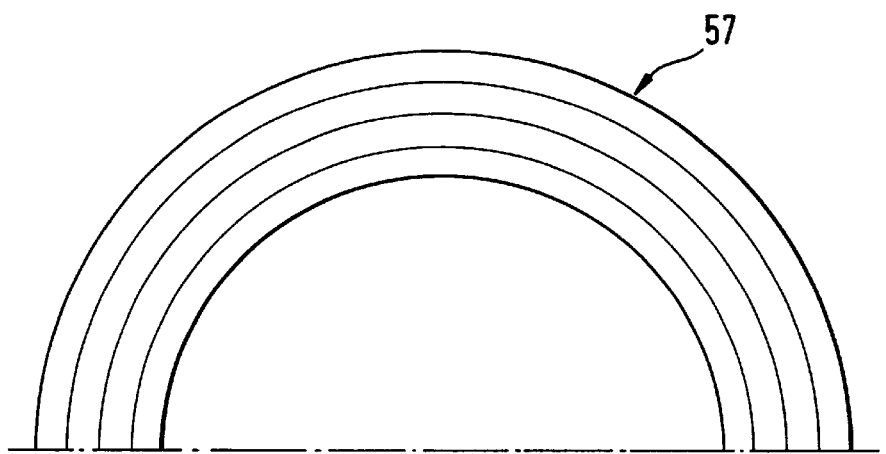

FIG. 5 shows a joint whose geometry, like the joint according to FIG. 3, substantially corresponds to that shown in FIG. 2. In this case, too, the guiding face $16_2$ is extended toward the right. In the region of the guiding face, the inside of the ball cage is provided with an inner groove 54 into which there is inserted a resilient securing ring 55, with a resiliently compressible crinkled spring washer 57, in turn, being supported on said disc 56. Between said spring washer 57 and the inner joint part 14 there is arranged a supporting ring 58 with a conical contact face 59 which rests against the guiding face $16_2$. In FIG. 5b, which represent the plan view in the direction of arrow 5b, there is shown the crinkled spring washer 57. If the inner joint part 14 is displaced towards the right relative to the ball cage 21, the spring washer 57 applies returning forces acting in the opposite direction. If the inner joint part 14 is displaced in the opposite direction relative to the ball cage 12 toward the left in the Figure, the inner joint part 14, under practical operating conditions, is returned into the central position as shown by returning forces which are applied by the balls if the joint is articulated and which are symbolized by a force arrow Fx.

From the foregoing, it can be seen that there has been brought to the art a new and improved constant velocity ball joint that has advantages over prior art designs. While the invention has been described in connection with one or more embodiments, it will be understood that the invention is not limited thereto. On the contrary, the invention covers all alterations, modifications and equivalents as may be included with the spirit and scope of the appended claims.

What is claimed is:

1. A constant velocity ball joint comprising:
   an outer joint part (11) with an inner cylindrical guiding face (13) provided with first, longitudinally extending ball grooves (12);
   an inner joint part (14) with a convex guiding face (16) provided with second, longitudinally extending ball grooves (15);
   torque transmitting balls (32) which run in first and second ball grooves (12, 15) associated with one another;
   an annular ball cage (21) which holds said balls (32) in a ball center plane (E), the ball cage comprising an outer spherical control face (22) whose greatest diameter is axially removed in a first direction by a distance (x) from the ball center plane (E), and an inner concave control face (25) whose greatest diameter is axially removed in a second direction by a distance (x) from the ball center plane (E), and wherein the inner control face (25) in the ball cage (21) forming end stops for delimiting an axial displacement path of the inner joint part (14) relative to the ball cage (21); and a resilient member (42, 47, 49, 57) which is effective between the ball cage (21) and the inner joint part (14) and which, at least when the ball cage is axially displaced relative to the inner joint part from the center of the axial displacement path in one axial direction, is pre-tensioned, wherein the resilient member comprises two resilient annular elements (42, 47) which are inserted on both sides of the greatest diameter of the control face (25) inside the ball cage (21) and which are in contact with the convex guiding face (16) of the inner joint part (14).

2. A constant velocity ball joint comprising:

an outer joint part (11) with, an inner cylindrical guiding face (13) provided with first, longitudinally extending ball grooves (12);

an inner joint part (14) with a convex guiding face (16) provided with second, longitudinally extending ball grooves (15);

torque transmitting balls (32) which run in first and second ball grooves (12, 15) associated with one another;

an annular ball cage (21) which holds said balls (32) in a ball center plane (E), the ball cage comprising an outer spherical control face (22) whose greatest diameter is axially removed in a first direction by a distance (x) from the ball center plane (E), and an inner concave control face (25) whose greatest diameter is axially removed in a second direction by a distance (x) from the ball center plane (E), and wherein the inner control face (25) in the ball cage (21) forming end stops for delimiting an axial displacement path of the inner joint part (14) relative to the ball cage (21); and a resilient member (42, 47, 49, 57) which is effective between the ball cage (21) and the inner joint part (14) and which, at least when the ball cage is axially displaced relative to the inner joint part from the center of the axial displacement path in one axial direction, is pre-tensioned, wherein the resilient member comprises at least one resilient annular element (49, 57) which is inserted on one side of the greatest diameter of the control face (25) inside the ball cage (21) and which is in contact with the convex guiding face (16) of the inner joint part (14).

3. A joint according to claim 1, wherein the resilient annular element (42, 47) is provided with radial fingers (51).

4. A joint according to claim 2, wherein the resilient annular element (49) is provided with radial fingers (51).

5. A joint according to claim 2, wherein the resilient annular elements (49) can be axially deflected on its inner edge (50).

6. A joint according to claim 1 or claim 2, wherein the ball cage (21) includes inner grooves (41, 48) and the resilient member (42, 49) is inserted into said inner grooves (41, 48) of the ball cage (21).

7. A joint according to claim 6, wherein the resilient member (42) is radially resiliently moveable in the inner groove (41) of the ball cage (21).

8. A joint according to claim 1 or claim 2, wherein the inner concave control face (25) of the ball cage (21) comprises a spherical face with a slightly greater diameter ($R_{25}$) relative to the greatest diameter of the guiding face (16) of the inner joint part (14).

9. A joint according to claim 1 or claim 2, wherein the convex guiding face (16) of the inner joint part (14) comprises two spherical face portions ($16_1, 16_2$), whose centers ($M_4, M_5$) are displaced relative to a plane ($E_x$) of the greatest diameter by identical amounts ($S_1, S_2$) in opposite directions in such a way that the radii of curvature ($R16_1, R16_2$) of the spherical face portions ($16_1, 16_2$) intersect one another.

10. A joint according to claim 1, or claim 2, wherein the inner concave control face (25) of the ball cage (21) comprises a central inner cylindrical face and two spherical face portions whose centers are located approximately at the ends of the inner cylindrical face, so that the spherical face portions tangentially adjoin the inner cylindrical face, with the inner cylindrical face having a slightly greater diameter than the diameter of the guiding face (16) of the inner joint part (14).

11. A joint according to claim 10, wherein the convex guiding face (16) of the inner joint part (14) comprises a spherical face.

12. A joint according to claim 1 or claim 2, wherein the resilient member comprises a resilient crinkled spring washer (57) which is supported by a securing ring (55).

13. A joint according to claim 12, wherein the spring washer (57) is axially compressible.

14. A joint according to claim 12, wherein the securing ring (55) is radially compressible.

* * * * *